United States Patent Office 3,392,260
Patented July 9, 1968

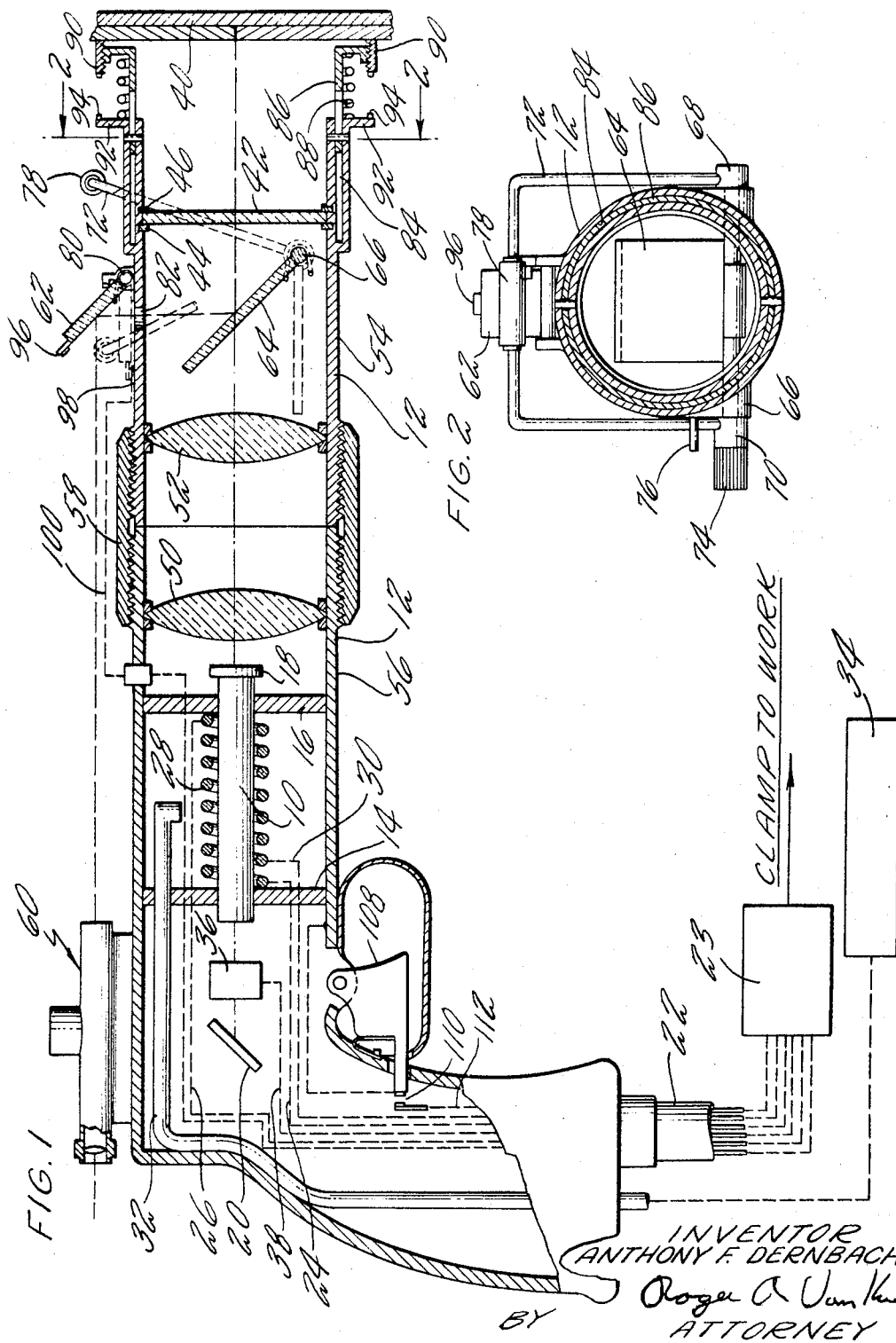

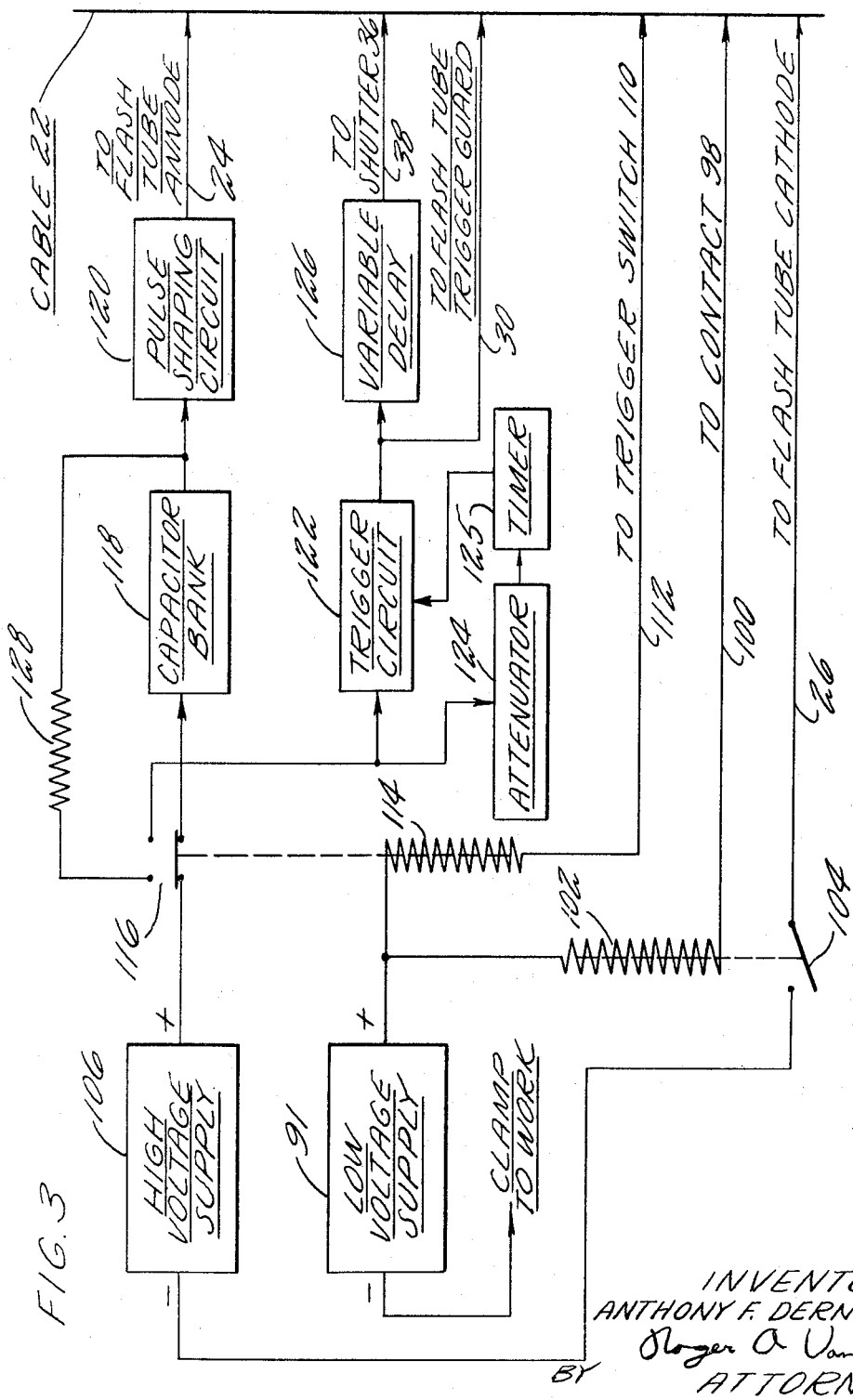

3,392,260
PORTABLE BEAM GENERATOR
Anthony F. Dernbach, West Hartford, Conn., assignor to United Aircraft Corporation, East Hartford, Conn., a corporation of Delaware
Filed Dec. 18, 1964, Ser. No. 419,373
3 Claims. (Cl. 219—121)

ABSTRACT OF THE DISCLOSURE

A portable coherent light beam generator designed for the working of materials and characterized by a column having positioned therein an optical maser, means for focusing the beam of coherent light provided by the maser at a point past the end of the column and transparent means positioned adjacent the end of the column to protect the focusing means from debris emanating from the beam impingement point on the material being worked. The portable beam generator is also characterized by a column extension which, when positioned against the surface of the material to be worked, will insure that the beam of coherent light is focused at the material surface and is perpendicular to the plane of the surface.

---

This invention relates to a welding or cutting tool. More particularly, this invention is directed to portable apparatus which utilizes an energized beam to transfer sufficient energy to a workpiece to accomplish localized operations requiring melting or partial vaporization.

While not limited thereto, this invention contemplates using the output of an optical maser as a portable yet precisely controllable source of thermal energy. Such an energy source, consisting of a high intensity beam of photons, may be used to weld, cut, machine or drill holes in any material. In order to have wide utility, such energy sources must be made portable. However, in so doing, various problems are encountered. For example, the energy of the beam generated by an optical maser will only be sufficiently intense, such that it may accomplish work, at the beam focal point. Thus, means must be provided to insure that the desired beam impingement point is located at the focal point of the beam prior to pumping. Coincident with the foregoing consideration, for most purposes, is the requirement that the normal axis of the output beam from the optical maser be perpendicular to the surface of the work before pumping.

It is an object of this invention to provide a portable energized beam source which avoids the aforementioned problems.

It is also an object of this invention to provide a novel portable energized beam source.

It is another object of this invention to predetermine the focus point of the energized beam generated by a portable beam generator.

These and other objects of this invention are accomplished, in the preferred embodiment to be disclosed below, by an optical maser or laser which has been made portable. Means are provided on this portable laser device for adjustment of the beam focal distance and for insuring that the axis of the beam provided by the active laser element is perpendicular to the surface of the workpiece and the point to be worked is located at the focal point of the beam prior to optical pumping.

This invention may be better understood and its numerous advantages will become apparent to those skilled in the art by reference to the accompanying drawing wherein like reference numerals refer to like elements in the various figures and in which:

FIGURE 1 is a cut away side view of a preferred embodiment of the portable energized beam generator of this invention.

FIGURE 2 is a sectional view along line 2—2 of FIGURE 1.

FIGURE 3 is a block diagram of the power supply employed with the apparatus of FIGURE 1.

Referring now to FIGURE 1, there is disclosed apparatus which employs an optical maser or laser to generate an energized beam. The active laser element 10, which may be a ruby rod, is supported on the axis of a cylindrical barrel 12 by means of a pair of Teflon supports 14 and 16. As is well known, means must be provided for the feedback of optical energy to active element 10. For this purpose, an optical feedback cavity or Fabry-Perot resonator is formed by mirrors 18 and 20. Mirror 18, which preferably is fastened directly to the end of element 10, will be less than 100% reflective so that the laser may fire therethrough. As will be explained in more detail below, means may be provided between external mirror 20 and the end of element 10 to control the feedback of optical energy from mirror 20 thereby modulating or gating the laser output to provide for high energy output pulses and thereby increase the efficiency of the device.

In order to stimulate the emission or generation of coherent light by a lasser, means must be provided for delivering pumping energy to the active laser element. For this purpose in the apparatus being described, there is provided a power supply 23, shown in more detail in FIGURE 3, which is connected to the portable beam generator by means of a flexible power cable 22. By means of conductors 24 and 26 of cable 22, a capacitor bank will be connected, in the manner to be described below, across a flash lamp 28 which surrounds laser element 10. A trigger pulse may be applied to the trigger grid of flash lamp 28 via conductor 30 of cable 22. The flash lamp 28 and its igniting circuitry are conventional pumping apparatus and form no part of the present invention.

As noted above, for maximizing efficiency, means may be provided for gating or modulating the laser. As shown in FIGURE 1, the gating means 36 is positioned between an end of active laser element 10 and external mirror 20. Gating means 36 may take several forms. For example, a system of rotating mirrors may be used. It has, however, been found desirable to employ an ultrasonic cell and its associated transducer as the gating means. The operation of such an ultrasonic gating means is described in detail in copending application Ser. No. 228,969, filed Oct. 8, 1962, now abandoned in favor of continuation application Ser. No. 653,289, filed June 15, 1967, by Anthony J. DeMaria and assigned to the same assignee as this invention. Briefly, the ultrasonic cell functions as a shutter and thus operates to prevent oscillation or optical maser action until a large overpopulation of the upper energy level of the laser rod results. During pumping, that is when the flash lamp 28 is fired, oscillation of atoms between upper and lower energy levels occurs in laser element 10. During this oscillation period of the optical maser, induced emission decreases the lifetime of the upper of the two maser levels thereby limiting the possible population inversion for a given pumping power. This limitation of the inversion population in turn limits the output peak power of the device. Since the R1 fluorescence line has a spontaneous decay time of a few milliseconds, energy may be stored in this level for approximately the duration of the pumping flash if means are available to withhold lasing action. Thus, by constructing an optical laser as shown with reflector 20 detached and then inserting a closed shutter in the optical feedback path, the device will not oscillate and a large overpopulation of the upper level will result. If the shutter is opened when the overpopulation is at a maximum, optical maser action will be initiated and an extremely large output pulse will be generated.

It has been found that the insertion of an ultrasonic cell between an external reflector and the laser element will lead to a shutter action. However, it is necessary that the external reflector, in this case mirror 20, be positioned so that it is not parallel to the other external reflector, attached mirror 18. The deviation from parallelism must be sufficient to prevent lasing action with a given amount of optical pumping. When the overpopulation of the upper level is a maximum, a pulse will be supplied to the transducer on the ultrasonic cell by means of a conductor 38 in cable 22. When a light beam is passed through an ultrasonic field, defraction, refraction and focusing occur depending upon the relation between the width of the light beam and the wave length of the sound wave. These phenomena arise from the alternating compressions and refractions altering the density of the medium through which the ultrasonic waves pass. The optical index of refraction depends upon the density of the medium through which the light is passing. For the case where the width of the light beam $w$ is much narrower than the sound wave $P^*$, refraction prevails and the light beam is refracted back and forth in a sinusoidal manner. The deflection angle $\theta$ is given by the expression:

$$\sin \theta = \frac{2\pi \Delta r L}{\lambda^*} \cos 2\pi f^* t$$

where $\Delta r$ is the maximum change of the refractive index caused by the ultrasound, L the path length of the light within the sound field, and $f^*$ the ultrasonic frequency. Thus, by pulsing the ultrasonic cell when overpopulation of the upper level of the optical maser is at a maximum, a condition will occur wherein the radiation is directed perpendicular to the external reflector 20. At this time, a high restoration of positive feedback to the laser is initiated and oscillation will result in a large burst of radiation which will pass through less than 100% reflective mirror 18. The intensity or magnitude of the pulse of radiation, and thus the energy in the beam impinging on the work after focusing may be controlled, within limits, by controlling the time relation between the firing of flash tube 28 and the pulsing of ultrasonic cell 36, Obviously, if continuous operation is desired, ultrasonic cell 36 may be eliminated and mirror 20 rotated to the position where it is parallel with mirror 18. Also, the ultrasonic cell may be retained and employed to gate the laser off at desired times by interrupting feedback from parallel mirror 20 and thereby providing pulse width modulation.

As will be obvious to those skilled in the art, means must be provided for forcing a flow of cooling fluid around laser element 10 and flash lamp 28. For this purpose there is provided a conduit 32 which discharges cooling fluid into the region between supporting members 14 and 16. Conduit 32 is connected at its input end with a pressurized source of cooling fluid 34 which, under usual circumstances, will be dry nitrogen under pressure. Alternatively, source 34 may consist merely of a blower motor for forcing air through conduit 32. It should further be noted that, if deemed necessary, means can be provided in power supply 23 for enforcing a required cooling period between successive laser pulses. The provisions for cooling and/or duty cycle control obviously depend upon the material of the laser element and the work to be performed.

The pulse of coherent light generated by the laser element will pass down barrel 12 of the apparatus and impinge upon a workpiece 40 which may be a pair of plates to be spot welded together or to have a hole drilled simultaneously therethrough. Just prior to impinging upon workpiece 40, the light beam passes through a dust glass 42 which is held in place by a pair of snap rings 44 and 46 and is thus easily removable for cleaning or replacement. Dust glass 42 is required in order to prevent vapors and splatter emanating from the point of impingement of the beam on the workpiece from condensing on and thus interferring with proper functioning of the optical viewing system and focusing lenses which are located between dust glass 42 and active laser element 10.

After passing through mirror 18, the beam of coherent light from the laser element is first defocused and then refocused by a condensing lens system consisting of lenses 50 and 52. Due to the fact that the output beam from a laser has little divergence, it becomes necessary to defocus the beam to prevent damage to dust glass 42. By spreading the beam over a large diameter spot at the dust glass, said beam being precisely refocused past the dust glass by lens 52, possible damage to the dust glass will be prevented.

Under some conditions it may be necessary to work the interior of a workpiece. That is, it may be necessary to have the beam focussed at a given distance past the surface of the work against which the barrel of the portable beam generator of this invention abuts. In order to accomplish the foregoing, the barrel 12 of the disclosed apparatus is divided into two sections, 54 and 56, which are oppositely threaded and joined by a sleeve 58. By rotating sleeve 58, the distance between lenses 50 and 52 may be varied and thus the beam focal point will simultaneously vary. In order to accurately determine the distance past the end of barrel section 54 at which the beam of coherent light will be focussed for the particular setting of sleeve 58, a calibrated window may be provided in sleeve 58. By observing the distance between the normally abutting ends of barrel sections 54 and 56 through this window, and reading from the scale on said window, the distance, in inches, past the end of barrel section 54 at which the beam is focussed may be read.

As noted above, means must be provided to visually observe the beam focal point prior to pumping the laser. For this purpose, an optical viewing system comprising a monocular microscope assembly 60 and a pair of mirrors 62 and 64 is provided. Assembly 60 includes a system of magnifying lenses, a reticle and a viewing light. The illumination provided by the viewing light is directed by a system of mirrors, not shown, along the optical viewing path. Thus, the light will emanate from assembly 60 and will be reflected by mirror 62 through viewing port 82. Thereafter, the light will be reflected by mirror 64 through dust glass 42 and will illuminate the workpiece. Obviously, mirror 64 must be rotated out of the path of the laser beam prior to pumping. Also, as noted above, means must be provided to insure that the operator will not directly observe the work when the beam of coherent light from the laser is impinging thereon. To simultaneously accomplish both of the foregoing functions, as can best be seen from FIGURE 3, mirror 64 is mounted on a supporting shaft 66 which extends through barrel section 54. The opposite ends of shaft 66, which is rotatable, are fitted with caps 68 and 70. A bail assembly 72 engages holes provided for this purpose in caps 68 and 70. The right hand end of shaft 66, adjacent to cap 70, also has a knurled knob 74 attached thereto. During sighting, mirror 64 will be maintained in the position indicated in FIGURE 1, which position is determined by an external mechanical stop 76 for bail 72, by spring action. After the device has been properly aligned so that the beam focus point and the desired point to be worked coincide, knob 74 will be rotated by the operator such that mirror 64 will fold down to the position shown by the broken line in FIGURE 1. Simultaneously, bail 72 will swing downwardly towards the butt of the apparatus and a roller 78 carried thereon will contact mirror 62 and thus cause this mirror to also fold down towards the butt of the laser device. As with mirror 64, mirror 62 rotates with a supporting shaft 80 and, when contacted by roller 78 on bail 72, folds downwardly and covers up viewing port 82 in the barrel. Thus, by rotating knob 74, the operator will fold mirror 64 out of the way and simultaneously close viewing port 82 thus preventing accidental viewing of the beam impingement point. Means, not shown, are provided to keep mirrors 62 and 64 folded down until such time as the bail 72 is returned to its initial position by the operator's rotation of knob 74 at which time the mirrors are returned by spring action to the positions shown in FIGURE 1.

In order to insure that the axis of the beam of coherent light produced in the apparatus of this invention is perpendicular to the surface of the work and that, under usual circumstances, the surface of the work is located at the beam focal point, means are provided to prevent pumping of the laser until the device of this invention is properly positioned against the surface of the work. As can be seen from FIGURES 1 and 2, the end of barrel section 54 is machined or cast so as to provide a circular slot 84 therein. A cylindrical shaped nonconductive member 86 engages slot 84. A spring 88 urges member 86 forward and out of slot 84. Member 86 has a pair of oppositely disposed slots therein which terminate just short of the forward end thereof. Barrel section 54 has pin holes machined therein through which pins are inserted into these slots. Thus, member 86 may not leave slot 84 nor rotate therein relative to barrel 54. The outer end of nonconductive member 86 has an L-shaped projection which is externally threaded. A metallic, internally threaded cylindrical sleeve engages this projection on member 86 and extends past the same both towards the workpiece and back towards the barrel section 54. The end of the slotted portion of barrel section 54 has an outwardly projecting circular portion 92 which carries a series of contacts 94. In operation, the operator urges the apparatus of this invention against the surface of the workpiece thereby compressing spring 88. As will be explained in more detail below, the laser cannot be pumped until the inwardly projecting portion of conductive member 90 is in contact with contacts 94 and the surface of the workpiece. Under normal circumstances, where work is to be performed at the surface of the workpiece, the beam of coherent light generated by active element 10 will be focussed by lenses 50 and 52 precisely at a distance past lens 52 equal to the combined length of member 90 and the portion of barrel section 54 downstream of lens 52. It must also be noted that nonconductive member 86 will not slide in slot 84 unless the apparatus of this invention is positioned perpendicular to the workpiece and thus contact between member 90 and contacts 94 cannot be made until this perpendicular condition is achieved.

While power supply 23 forms no part of this invention, nevertheless FIGURE 3 will be briefly described. Power supply 23 comprises a variable high voltage supply 106 which, upon closing of the lower contacts of switch 116, delivers a D.C. output voltage to a capacitor bank 118. Capacitor bank 118 is connected, via a pulse shaping circuit 120 and conductor 24, to the anode of flash tube 28. In order to ionize the gas in flash lamp 28, a trigger circuit 122, which supplies a high voltage pulse to the grid of flash lamp 28 via conductor 30 is provided. The voltage pulse supplied to the flash tube grid ionizes the gas in the flash tube thereby permitting the capacitor bank 118 to discharge therethrough producing an intense burst of pumping light. Pulse shaping circuit 120, which in the usual case comprises merely an inductor, serves to smooth the output pulse from the capacitor bank.

It should be noted that an attenuator 124 and timer 125 are provided for generating an "on" gating signal for trigger circuit 122 at an interval after closing of switch 116 such that the capacitor bank has time to become fully charged. At the same time that trigger circuit 122 fires producing ionization of the gas in flash lamp 28, it also supplies a control signal to a variable delay line 126. The delayed trigger pulse from delay line 126 is applied via conductor 38 as the activating signal to the transducer in ultrasonic cell 36. Upon return of switch 116 to its upper pair of contacts, a resistor 128 will discharge any charge remaining on capacitor bank 118. As should be obvious, solenoids 102 and 114, which control switches 104 and 116 in the manner to be described below, may comprise holding relays and, if desired, circuitry may be provided to terminate current flow therethrough after a desired interval of time.

In operation, considering now FIGURES 1 and 3 together, the operator positions the end of the barrel against the workpiece and visually sights to determine if the beam impingement point coincides with the point where it is desired to accomplish work. After insuring that the desired coincidence exists, the apparatus will be urged forward against the work thereby compressing spring 88 and causing contact between member 90 and contacts 94. Next, knob 74 will be turned to rotate mirror 64 out of the path of the laser beam while simultaneously rotating mirror 62 so as to disable the line of sight between the operator's eyepiece and the beam impingement point. It should be noted that mirror 62 carries a contact 96 which, upon rotation of knob 74 and bail 72, will be urged against a contact 98 mounted on and insulated from barrel section 54. Contact 98 is connected via conductor 100 to the power supply 23. Contact 96 is connected via the frame of mirror 96, barrel section 54 and member 90 to the workpiece. The negative terminal of low voltage D.C. source 91 in power supply 23 is clamped to the workpiece prior to working. Thus, as can be seen from FIGURE 3, the closing of contacts 96 and 98 when mirror 62 is folded down completes a current path from the positive terminal of supply 91, through a solenoid 102, barrel section 54, workpiece 40, and back to the negative terminal of supply 91. The flow of current through solenoid 102 causes closing of the contacts of switch 104 in power supply 23 and thereby connects the negative terminal of a high voltage supply 106 to the cathode of flash tube 28 via conductor 26. Thus, it will be obvious that the laser cannot be pumped until the means for visually observing the beam impingement point have been completely disabled. Similarly, the laser cannot be pumped until spring 88 has been compressed to the point where member 90 is in electrical contact with barrel section 54 and, accordingly, the beam focus point is at the surface of workpiece 40.

Next, the operator will activate trigger 108 thereby closing the contacts of a switch 110 located in the handle of the apparatus. The closing of the contacts of switch 110 completes a current path, via barrel sections 54 and 56, from the power supply to the workpiece. As can be seen from FIGURE 3, activation of trigger 108 causes current flow from the low voltage D.C. supply 91 through the solenoid 114. Current flow through solenoid 114 in turn causes closing of switch 116 to its lower pair of contacts thereby connecting the positive terminal of high voltage supply 106 the rest of the firing circuitry for the laser. Thus, it should be obvious that a second means, trigger 108, is provided for withholding pumping action until the desired moment and until the beam focus point is at the surface of workpiece 40.

While a preferred embodiment has been shown and described, various modifications and substitutions may be made without deviating from the scope and spirit of this invention. Thus, this invention is described by way of illustration rather than limitation and accordingly it is understood that this invention is to be limited only by the appended claims taken in view of the prior art.

I claim:
1. Apparatus for working materials with an energized beam comprising:
   means for generating an energized beam, said beam having an axis;
   a portable gun housing containing at least a portion of said beam generating means, said housing defining a beam column coaxial with the axis of the beam and extending downstream from the beam generat- ing means toward the surface of a material to be worked;

means positioned within said column for focussing the beam a predetermined distance past the end thereof;

a hollow column extension; and means supporting said column extension coaxially with said end of said column, the combined length of said extension and the portion of said column downstream of said focussing means being equal to the image distance of said focussing means whereby the surface of the material to be worked will be located at the beam focal point and will be substantially perpendicular to the axis of the beam when said extension is urged against said material, said material simultaneously being subjected to pressure and the region of the material to be worked being encircled by the end of the column extension.

2. The apparatus of claim 1 wherein said means for generating an energized beam comprises:

an optical amplifier whose selectively fluorescent medium is arranged in an optical resonator cavity defined by two reflectors; and means for supplying pumping energy to said optical amplifier whereby a beam of coherent light will be generated and focused at the surface of the material to be worked when said column extension abuts the surface thereof.

3. The apparatus of claim 2 further comprising:

means positioned within said column between said focussing means and the surface of the material to be worked for preventing condensation on said focussing means of vapors emanating from the point of beam impingement, said condensation preventing means being transparent to said beams; and removable resilient means positioned within said column for supporting said condensation preventing means, said resilient means permitting the removal of said condensation preventing means for cleaning and replacement.

References Cited

UNITED STATES PATENTS

| 3,265,855 | 8/1966 | Norton | 219—121 |
| 3,304,403 | 2/1967 | Harper | 219—121 |
| 3,308,396 | 3/1967 | Comstock et al. | 219—121 |

OTHER REFERENCES

"Directed Energy Weapons," by Dr. Jack De Ment, Electronics Industries, August 1962, pp. 92–96.

RICHARD M. WOOD, *Primary Examiner.*

W. D. BROOKS, *Assistant Examiner.*